United States Patent [19]
Webb

[11] 4,025,831
[45] May 24, 1977

[54] BRUSHLESS DIRECT CURRENT MOTOR

[76] Inventor: Robert L. Webb, P.O. Box 2180, Balboa, Canal Zone

[22] Filed: Feb. 18, 1975

[21] Appl. No.: 550,581

[52] U.S. Cl. ............................................. 318/254
[51] Int. Cl.² .................................... H02K 29/00
[58] Field of Search .......................... 318/138, 254

[56] References Cited
UNITED STATES PATENTS

| | | | |
|---|---|---|---|
| 3,025,443 | 3/1962 | Wilkinson et al. | 318/138 |
| 3,160,804 | 12/1964 | Quittner | 318/138 |
| 3,321,685 | 5/1967 | Johannes | 318/138 |
| 3,435,313 | 3/1969 | Siefert et al. | 318/138 |
| 3,634,873 | 1/1972 | Nishimura | 318/254 |

*Primary Examiner*—Gene Z. Rubinson
*Attorney, Agent, or Firm*—Gustave Miller

[57] ABSTRACT

A direct current motor is provided by a rotor provided with a plurality of permanent magnets, at least one fixed electromagnet slightly spaced from the rotor periphery and a magnetically operated reversing switch controlled by the permanent rotor magnets to excite an electromagnet to alternately attract and repel the permanent magnets. The switch may be controlled by magnets other than the rotor magnets, rotated synchronously with the rotor.

17 Claims, 14 Drawing Figures fig. 9 fig. 8

BRUSHLESS DIRECT CURRENT MOTOR

BACKGROUND OF THE INVENTION

Direct current electric motors typically include a commutator and brushes for providing a rotary magnetic field in order to cause rotation of the rotor thereof. The use of a commutator and brushes which frictionally engage the commutator, is not very desirable due to sparking, wear of the brushes and the necessity for periodically cleaning the commutator segments and to undercut their sides to provide a proper separation between adjacent ones to prevent shorting thereof. In order to avoid such construction, there have been developed in the prior art brushless direct-current motors which include a permanent magnet rotor housing and a stator winding providing a plurality of field coils. A plurality of stationary switches energized by respective taps in the rotor are operated in succession by the rotor to provide a rotating magnetic field for effecting a motor operation. Another type of brushless D.C. motor is provided by a rotor provided with permanent magnets and a like number of stationary electromagnets about the rotor which are intermittently energized simultaneously to attract the magnets in the rotor.

STATEMENT OF INVENTION

The invention herein disclosed is an improvement in the above described types of brushless D.C. motor. According to this invention, the rotor of the motor is in the form of a disc or plate having any desired even number of equiangularly spaced permanent magnets of the horse-shoe type about the periphery thereof. One or a plurality of fixed electromagnets are spaced slightly from the rotor periphery for magnetic cooperation therewith. In a preferred embodiment, a switch is controlled by the permanent magnets in the rotor to cause excitation of the electromagnets.

The above mentioned switch is provided with a magnetic operator located close to the rotor. The operator is elongated in the direction of movement of the rotor and is rockably mounted on an axis parallel to the rotor axis. As a permanent magnet approaches the operator, it causes movement thereof in one direction to operate the switch to provide current flow in one direction through the windings of the electromagnets to cause the poles thereof to assume a polarity such as to attract the permanent magnet of the rotor which is approaching it. As the permanent magnet moves relative to the operator, the latter will be rocked thereby by magnetic attraction to momentarily open the switch to deenergize the electromagnets. Continued movement of the switch operator by its coaction with the magnet on the rotor will cause the switch to connect the electromagnets to the source for current flow in the opposite direction to reverse the polarity of their poles in order to repel the permanent magnet as it leaves the electromagnet. The reversing switch may be of the leaf-spring contactor type, a pressure type or it may be an optical type of switch, i.e. where one pair of photoelectric devices is alternately exposed to a light beam under control of the above described magnetic operator for alternately causing the windings of the electromagnets to be reversibly connected to the current source. The switch is normally biased to a neutral position when free of magnetic influence.

Accordingly, it is an object of the invention to provide a brushless direct-current motor which is operated by both magnetic attraction and magnetic repulsion.

It is a further object of the invention to provide a brushless D.C. motor having a rotor with permanent magnet pole pieces and stationary field coils which are energized in parallel to coact with the permanent magnets.

An additional object of the invention is to provide a brushless D.C. motor having a plurality of rotatable and fixed magnets, commutation being effected by a single switch controlled by the rotor.

A still further object of the invention is to provide a brushless D.C. motor which has permanent magnets that are alternately magnetically attracted and repelled by controlled stationary electromagnets.

It is another object of the invention to provide a brushless D.C. pump motor wherein the rotor which carries the propeller is located within the conduit carrying the fluid.

It is still another object of the invention to provide a pump motor having a hollow ring rotor located within a fluid conduit and the field coils of which are external to the conduit.

With the above and other objects in view, a description of the invention proceeds with specific reference to the Figures of the drawing in which:

FIG. 3 is a schematic showing of the magnetically operated reversing switch for controlling energization of the electromagnets and permanent magnets within the rotor periphery;

DESCRIPTION OF THE INVENTION

Figure 1:
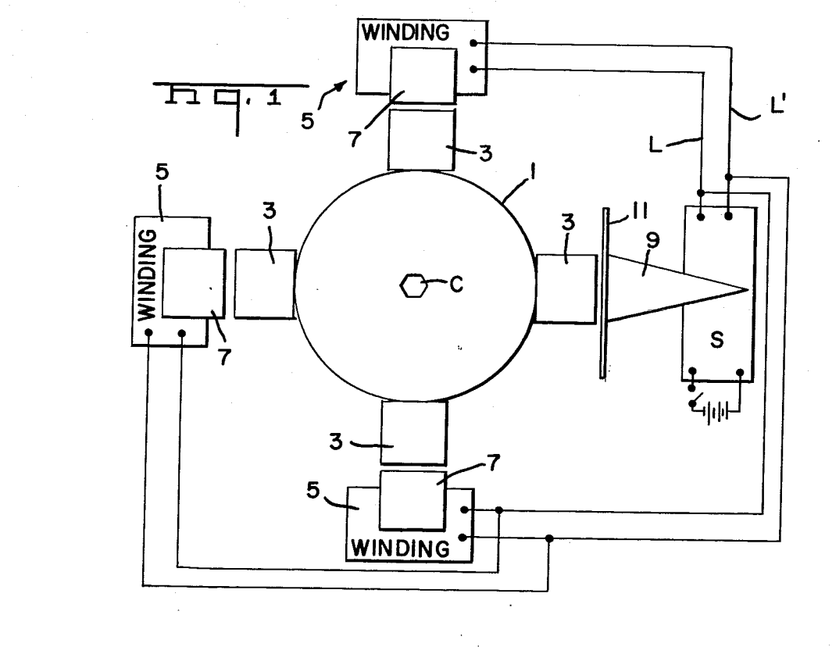
FIG. 1 is a diagrammatic side view of the motor of this invention.

Referring to FIG. 1, reference numeral 1 denotes the rotor of an electric motor which is in the form of a plate or cylinder of non-magnetic material 1 mounted on a shaft C for rotation about its center. Secured to and projecting from the rotor periphery are a plurality of equi-angularly spaced permanent magnets 3, each of which has its poles spaced from each other in a direction parallel to the rotor axis. Like poles of the magnets are in the same plane normal to the rotor axis. Although the permanent magnets 3 are shown in FIG. 1 as projecting from the periphery of the rotor, they may obviously be embedded therein with the pole-faces exposed at the rotor periphery as shown in FIG. 3. Fixedly mounted about the periphery of the rotor are a plurality of fixed electromagnets E each provided with a winding 5 and a magnet 7 having its poles oriented in the same direction as the poles of magnets 3. The poles of the magnets 7 are equally radially spaced from the rotor center and are located outwardly of, but close to the path of movement of the magnets 3 to provide a minimum air gap. When the poles of the magnets 3 are alined with the poles 7, the respective polefaces are in directly opposed relation to each other.

Fixedly mounted at a location spaced outwardly of the rotor periphery, is a double-pole double-throw switch S. The output of the switch is connected by leads to the windings 5 of the electromagnets in parallel to energize them. In order to reverse the polarity of the potential applied to the windings 5 from a D.C. source connected to the switch input, a rockable operating arm 9 is provided. The arm carries at its free end a magnetic plate or bar 11 which is spaced from the path of rotation of the magnets 3 to provide a small air gap. The center of the magnetic plate 11 lies on a radius of the rotor which passes through the center between the pole-faces of the magnet 7.

In one form of the switch S, as shown in FIG. 3, a pair of contact arms 13 and 13' may be connected together for concurrent movement by an insulating bar 15' secured at its center to a rotatable shaft 15 extending through and supported by opposite walls of the switch casing. The contact arms are connected to opposite terminals of a D.C. power source, such as a battery. The switch arm 9 is secured to shaft 15, external to the casing. As the shaft 15 is rocked clockwise, by movement of arm 9 in FIG. 3, contact c of arm 13 connected to the negative terminal of the battery, energizes lead L connected to one terminal of the windings 5, while contact b of arm 13' connected to the positive terminal of the battery energizes lead L' connected to the other winding terminals. Rocking shaft 15 counter-clockwise by movement of arm 9 reverses the polarity of the connections between the D.C. source and leads L, L' by engagement of contacts d and a with the respective leads. The switch contact arms 13 and 13' are normally biased to remain out of contact with the leads so as to deenergize the windings 5. This may be effected by coiled springs 16, about the ends of shaft 15, one end of each spring being connected to the shaft and the other end secured to the fixed casing S of the switch to maintain the rockable arm 9 in the neutral position shown in FIG. 1.

Figure 4:
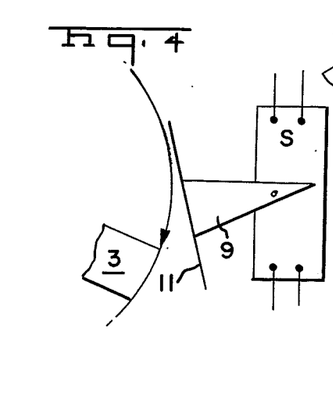
FIGS. 4 and 4a show in diagrammatic form the operation of a magnetic type of switch operator for controlling the switch by a permanent magnet of the rotor.
Figure 4A:
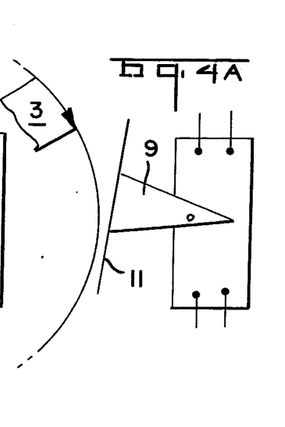

As can be readily appreciated, when the switch arm 9 is in the position shown in FIG. 4a, contacts 13, 13' of switch S contact the leads to cause current flow through the windings 5 in such a direction as to cause the pole-faces of magnets 7 to assume a polarity which is opposite to that of the corresponding pole-faces of permanent magnets 3. The rotor 1 will therefore rotate (clockwise for example) in an attempt to line up the pole-faces of magnets 3 with the nearest pole-faces of magnets 7. As the magnets 3 approach the respective electromagnets E, one of the magnets 3 is approaching the magnetic bar or plate 11 secured to the switch control arm 9, as shown in FIG. 4a. The magnetic plate 11 will be in the flux field of the permanent magnet 3 and will be attracted thereto to be driven thereby to the neutral position shown in FIG. 1 to cause arm 9 to withdraw contacts 13, 13' from the busses, to thus deenergize the windings 5. Due to momentum, the rotor 1 will continue to rotate so that the arm 9 will be moved by the plate 11 following the magnet 3 to its lower position shown in FIG. 4. This will reverse the current flow through the windings 5 so that the magnetic flux produced between the pole-faces of magnets 7 is such as to repel the magnets 3. As the field of the magnet 3, moving away from plate 11 is equal to the attraction of the field of a succeeding magnet 3 approaching the magnetic plate 11, the arm 9 will return to its central position by spring 16 to lift the contacts 13, 13' from the leads to deenergize the windings 5. As the following magnet 3 approaches the plate 11, it will be raised to operate the contacts 13, 13' to cause energization of the windings in a direction to allow the electromagnets E to again attract the magnets 3.

Figures 5, 6, 7:
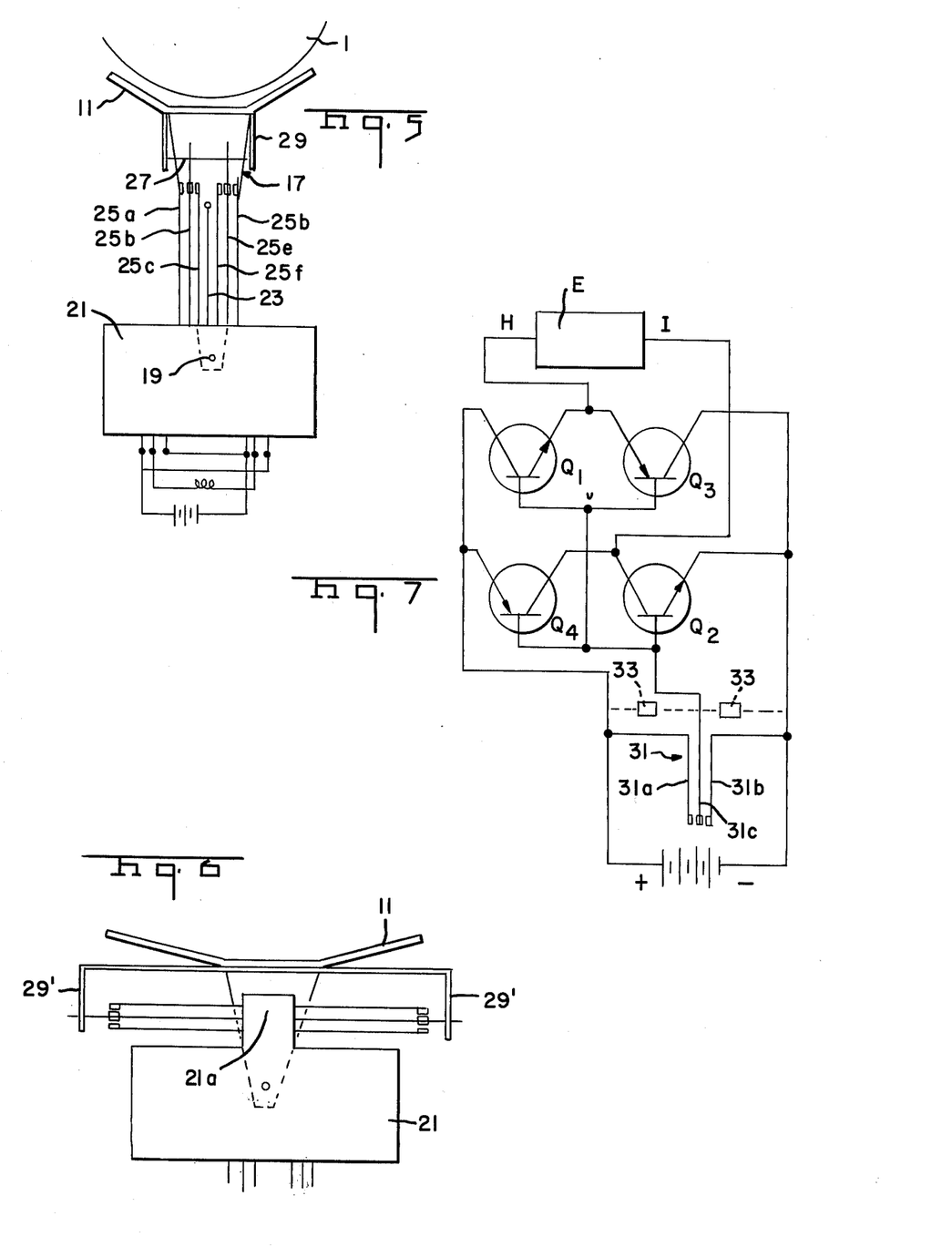
FIG. 5 is a side view of one form of a magnetically controlled contact switch of this invention.
FIG. 6 is a side view of a second form of a magnetically controlled contact switch.
FIG. 7 is a schematic of a transistor switching circuit for exciting an electromagnet in alternately opposite directions from a current source in response to operation of a reversing switch.
Figure 7:
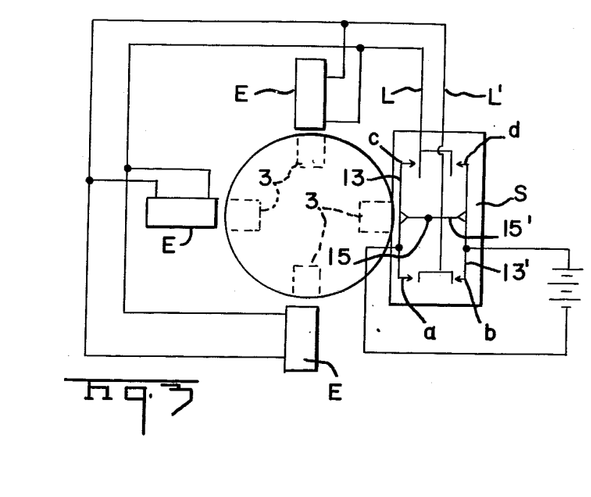

Various forms of switches S may be utilized to alternately reverse the direction of the current ot windings 5 in timed relation. One modification is shown in FIG. 5, wherein the magnetic plate 11 is contoured approximately to the path of rotation of the magnets 3. The plate is secured to one end of a bail member, one arm 17 of which is shown in FIG. 5, mounted to rock about a shaft 19 anchored in block 21. A spring 23 secured at one end in the block is secured at its other end to the arm 17 for maintaining it in a centered position. Also extending from the block 21 are six leaf springs 25a to 25f having contacts adjacent their free ends. As seen, one group of three closely spaced springs is spaced from a second similar group of springs. The central spring 25b of one group and 25e of a second group are longer than the remaining springs. An insulating bar 27 secures the springs 25b and 25e together so that they can move together when urged in either direction. The bar extends between a pair of spaced arms 29 projecting downwardly from the magnetic plate 11 to follow its rocking movements. The leaf springs 25b and 25e have a contact on each side thereof and are connected to respectively opposite terminals of the electromagnets E. Contact springs 25a and 25d are connected to one terminal of a D.C. power source while contact springs 25c and 25f are connected to the opposite terminals of the source, similar to that shown in FIG. 3. Energization of the electromagnets E can thus be effected by rocking of plate 11 to reverse the direction of the magnetic flux between its pole faces.

A similar form of switch to that shown in FIG. 5, is shown in FIG. 6 wherein three leaf springs having contacts on both ends are secured at their center portions in a projection 21a of block 21. The center leaves are connected to respectively opposite spaced insulating arms 29' extending downward from the magnetic bar 11. The electrical connections for energizing the electromagnets E of FIG. 1 to alternately reverse the direction of a D.C. current thereto, is obvious from the previous descriptions.

Figure 2:
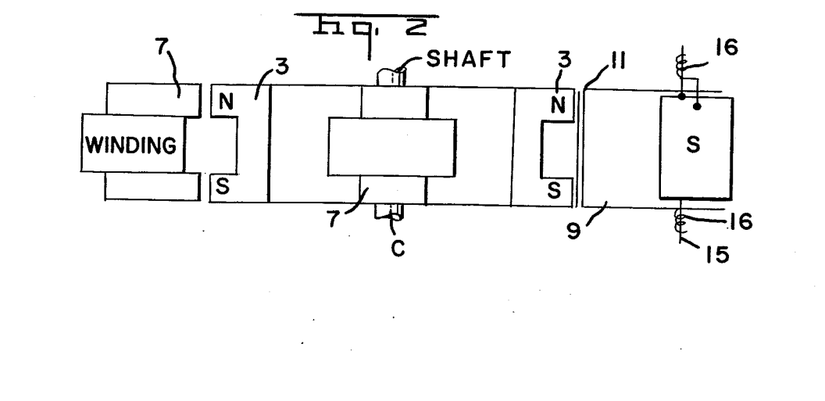
FIG. 2 is a diagrammatic end view of the motor of FIG. 1.

A further arrangement is shown in FIG. 7 for reversibly energizing the electromagnets E shown in FIGS. 1 and 2, wherein very small switching currents are used together with a lesser number of movable contacts than heretofore described. In this Figure, a switch 31 comprising a pair of spaced contacts 31a, 31b are connected to respectively opposite sides of a D.C. source, shown as a battery. A contact 31c normally centrally located between the contacts 31a, 31b is movable into engagement with one or the other, alternately. This action may be reversed by fixedly supporting the center contact 31c and moving the other two contacts in alternately opposite directions to engage the center contact. The center contact is connected to the bases of four transistors Q1, Q2 which are shown as of the NPN type and Q3, Q4 which are of the PNP type. The electromagnets E are connected in the current path between the emitter of Q1 and the collector of Q2 and are also connected between emitter of Q3 and the collector of Q4. When contacts 31a and 31c engage, the bases of transistors Q1 and Q2 become positive, thus causing them to conduct while Q3 and Q4 remain cut off, so that terminal H of the electromagnet is connected to the positive terminal of the battery and I is connected to the negative terminal. When contacts 31b and 31c engage, the current flow through electromagnet E reverses, since transistors Q3 and Q4 become conductive and Q1, Q2 are cut off.

Instead of utilizing a movable contact type of switch such as those described above, it is proposed to utilize contactless types of switches to avoid wear and sparking of the contacts. One such contactless type of switch is shown for example, in FIG. 8 wherein a pair of photosensitive devices 33 are mounted on a block 35, each facing a light source 37 fixedly located therebetween. Rockably mounted on the block as heretofore described, is the magnetic plate 11 provided on its underside with an inverted channel shaped member 39 with opaque side walls 41, each of which overlies the photosensitive device 33 to shield it from the light when the plate 11 is biased to its neutral or central position as above described. Thus no light impinges on the photosensitive devices which may be photocells, photoresistive devices, phototransistors etc. When the plate 11 is alternately moved from one side to the other by attraction to a permanent magnet on the rotor 1, the photosensitive devices will be alternately exposed to the light from the lamp and become suitably conductive and by means of a suitable circuit to cause current flow through the electromagnets E in alternately opposite directions. The circuit shown in FIG. 7 may be used to effect this result, the photosensitive devices 33 being connected as there shown in dotted lines and take the place of the movable contact switches 31 to alternately bias transistors Q1, Q2 and transistors Q3,Q4 in the manner above described.

Figure 8:
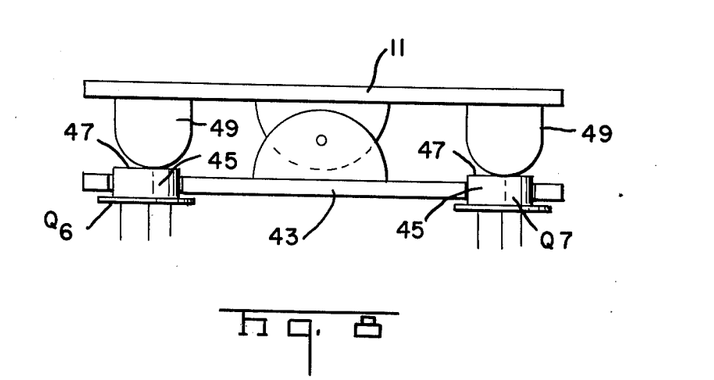
FIG. 8 is a side view of pressure type of current reversing switch.
Figure 9:
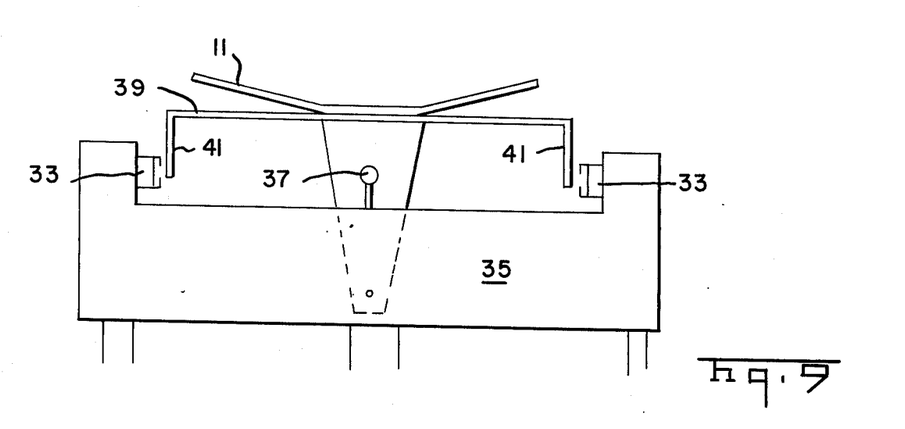
FIG. 9 is a side view of a circuit reversing switch utilizing a light beam.

A still further form of contactless switching device which may be used to advantage in controlling the motor of this invention, is a pressure sensitive transistor mounted to be controlled in the manner shown in FIG. 8. As is known in the art, a pressure sensitive transistor is a planar type of transistor which increases its conductivity by increase of pressure on its emitter-base junction. Such a transistor, in its practical form, is supported on a base within a housing, the upper wall of which is in opposed relation to the planar face of the transistor, being a diaphragm which is mechanically coupled to the emitter-base junction, so that changes in differential pressure on the diaphragm causes variations of pressure on the emitter-base junction to cause variation in the gain of the transistor. As depicted in FIG. 9, a pair of pressure sensitive transistors Q6, Q7 are mounted on a support, the transistor housing being designated 45 and the diaphragm thereof 47. Pivotally mounted on the support 43 intermediate its ends, is the aforementioned magnetic plate 11 having secured to its undersurface adjacent each end, an abutment member 49 of preferably semi-hard material. Each abutment bears very lightly or is minutely spaced from the diaphragm 47 when the plate 11 is in its neutral or unoperated position so that there is no, or a minimum of, pressure on the junction. Transistors Q6 and Q7 may be connected in the same manner as the photosensitive devices 33 of FIG. 7 to cause alternate conduction of transistors Q1, Q2 and Q3, Q4 by rocking movements of plate 11 as described with reference to FIG. 7.

Figure 10:
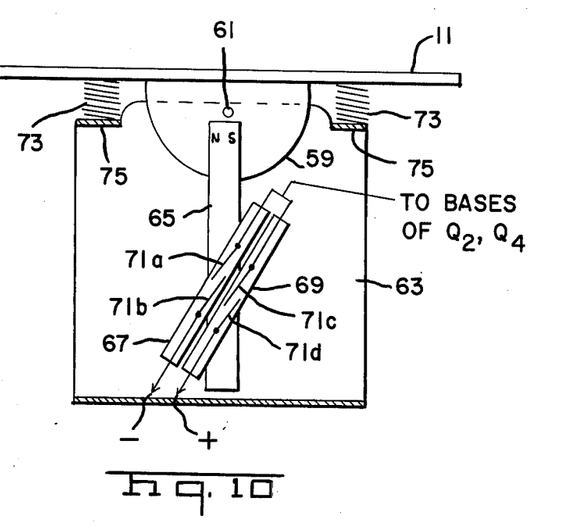
FIG. 10 shows a magnetic reed switch arrangement for use with the circuit of FIG. 7 to replace the leaf spring switch.
Figure 10A:
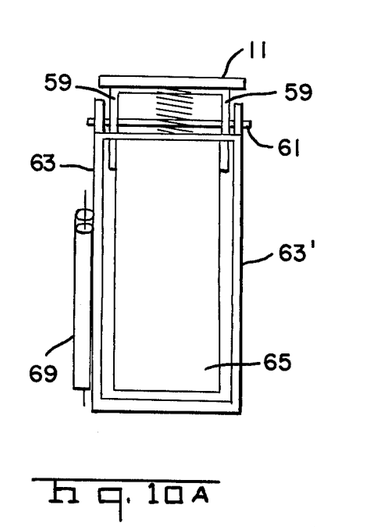
FIG. 10a is an end view of FIG. 10 with the addition of the side wall on which the switches are mounted.

A further form of switch arrangement advantageously utilized in connection with the transistor circuit of FIG. 7 is shown in FIG. 10. In this Figure, the magnetic plate 11, which is controlled by the permanent magnets of the rotor, is provided on its under side with a pair of depending laterally spaced arms 59 mounted to rotate with or about the axis of a shaft 61 extending through opposite walls 63, 63' of a casing. Secured between the arms 59 and depending therefrom, is a permanent magnet 65 in the form of a rectangular thin plate with its opposite narrow end walls spaced axially of the shaft 61. The opposite magnetic poles of the permanent magnet extend along respectively opposite sides of the narrow walls so that the path of the magnetic flux is transverse of the walls. Mounted on one side wall of the casing such as 63 shown in FIG. 10a, are a pair of parallel magnetically controlled reed switches 67, 69. Each reed switch as known in the art, comprises an elongated hollow-sealed glass tube preferably evacuated. Each tube contains a lead-in wire embedded within the glass end seal of each tube. At the inner end of each lead is connected a resilient magnetic reed such as 71a, 71b, 71c and 71d. The reeds within each glass tube extend inwardly toward each other part way into the tube and overlap slightly at their extreme free ends but are spaced from each other by a very narrow gap.

As seen in FIG. 10, the reed switches are positioned athwart the end wall of the permanently magnetized end wall of the plate magnet 65 at an angle of approximately 30° when the magnet is in its neutral position shown in FIG. 10. In this position of the magnet, it is noted that reed 71a of switch 67 does not confront the south pole of the magnet so that it does not become so polarized as to attract reed 71b which becomes a north pole due to its position over the north pole of the magnet. Switch 67 is therefore open. As to reed switch 69, it is noted that reed 71c is a south pole while reed 71d is sufficiently spaced from the north pole of the magnet 65 as to be unaffected thereby so that switch 69 is also opened. When the magnet 65 is moved clockwise relative to the switches by the magnetic plate 11 being rocked in a clockwise direction, the south pole of the magnet 65 moves close enough to reed 71a so that the latter becomes a south pole and attracts reed 71b to thus close switch 67. The lead from reed 71b is connected to one side of the battery in FIG. 7. As is obvious, switch 69 remains open since the north pole of magnet 65 moves still further away from reed 71d so that it does not become polarized oppositely to reed 71c. When the magnet 65 is rocked counterclockwise, it will be seen that switch 67 will open since the south pole of magnet 65 moves away from reed 71a breaking the flux path to allow reeds 71a and 71b to open. Switch 69 will be closed at this time since the north pole of magnet 65 moves into register with reed 71d and since reed 71c remains in register with the south pole, reeds 71c and 71d is closed, the lead from 71d is connected to the opposite side of the battery from that to which 71b is connected. In use, the leads from 71a and 71c are connected together and to the bases of transistors Q2 and Q4 of FIG. 7. The reed switches take the place of the leaf spring switches 31. In order to return the magnet 65 to neutral position to open both switches so as to cut off the transistors Q2, Q4, a compression spring is positioned between the plate 11 and the top wall portions of the casing 63 on both sides of the shaft 61. Thus, by rocking the magnet 65 in one direction or the other, the current through the windings will be alternately reversed.

Figure 11:
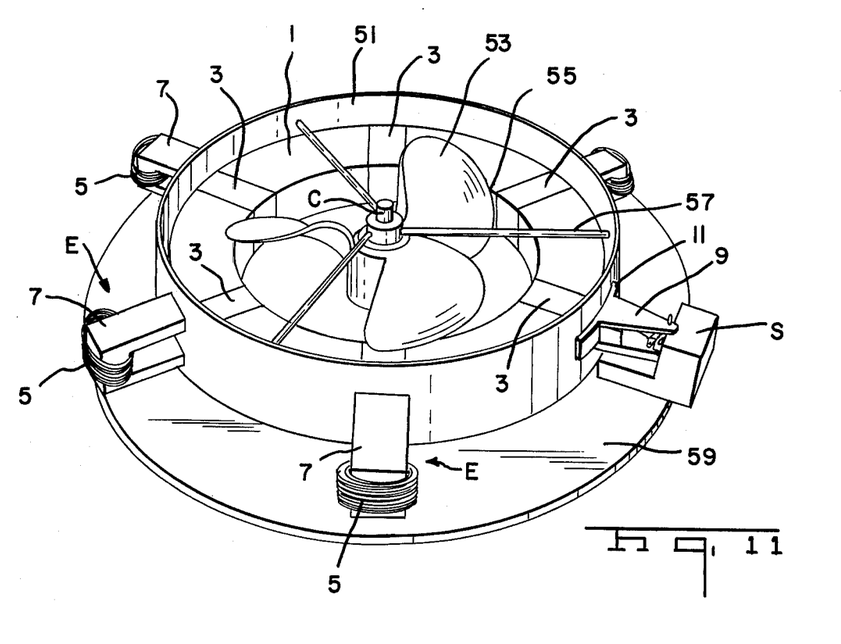
FIG. 11 illustrates a rotor of this invention in the form of a hollow ring and located within a conduit, with the electromagnets and switch operator external thereto.

The motor of my invention may be used under water without the need of utilizing a sealed housing therefor. It would only be necessary to ensure that the windings 5 of the electromagnets are suitably potted and that the switch housing is sealed. No bearing seals would be required and the motor would be constantly cooled by the water. The herein described motor could easily be adapted to be utilized as a flow pump located within a housing transparent to magnetic flux such as conduit 51, as shown in FIG. 11. The rotor 1' may be formed as a flat ring within the body of which the spaced permanent magnets 3 are embedded with their pole faces exposed at the outer periphery of the ring. A propeller 53 of non-magnetic material is centered within the opening in the ring rotor 1' and the tips of the propeller blades are fastened to the rotor 1' at 55, to rotate therewith. The rotor and propeller assembly may be mounted within the conduit 51 on a stub shaft member C supported centrally of the conduit by a plurality of struts 57 secured between the shaft and the inner wall of the conduit 51. The propeller is provided with a central opening to fit the shaft and is held thereon by a headed member (not shown) threaded into the shaft on the underside of that shown in FIG. 11. The conduit 51, is rigid and its thickness as small as possible consistent with the fluid pressures to be encountered within the conduit. Although the conduit is shown as a short section of a cylinder, which may be mounted on or within a long conduit of different material, it may be as long as desired. The inner diameter of conduit 51 is such that its inner peripheral surface is close to the outer surface of the rotor but just out of frictional engagement therewith. A flat supporting ring 59 is mounted on the outer periphery of the conduit 51 substantially in the vicinity where it is around the rotor 1 within the conduit. Mounted on the flat side of the supporting ring 59 are the electromagnets 5, the switch housing s and magnetically controlled switch arm such as 9, as described in the previous embodiments. These elements are mounted on the support ring 59 against the conduit and alined with the rotor to leave the least amount of space between them and the permanent magnets on the rotor. Where thick conduit or housing walls are required because of pressure requirements, the pole shoes 7 of the electromagnets could be embedded within the material of the housing during its molding process with the pole faces substantially at the inner surface of the housing, so as to reduce the gap between them and the permanent magnets on the rotor. The above described motor has great utility when used with explosive fluids since they would not be exposed to sparking by the motor, constructed in the manner described above.

Figure 12:
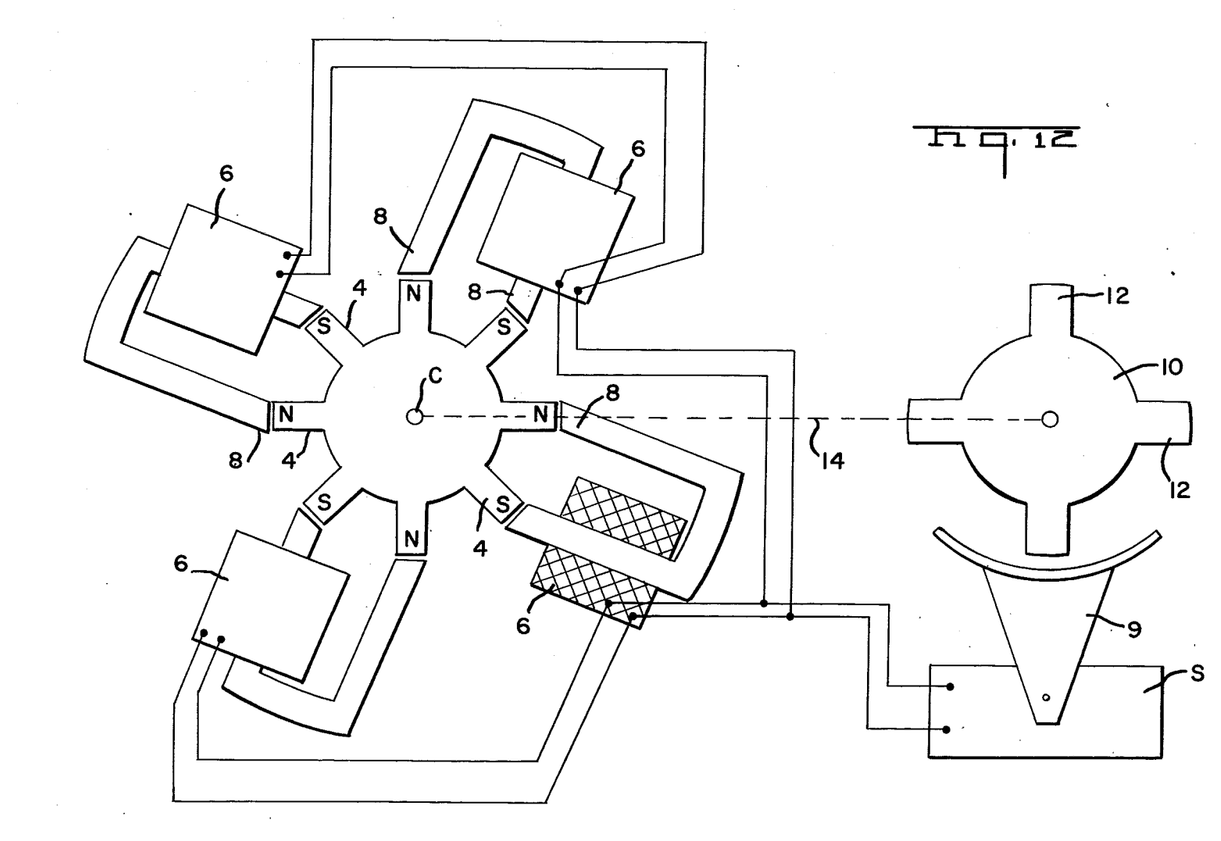
FIG. 12 shows a modified form of the invention wherein the magnetic poles of the rotor magnets and stationary electromagnets are rotated about an axis between their poles 90° from the last embodiment, and also shows the switch controlled by a device remote from the rotor.

A modified form of the invention will now be described in connection with FIG. 12 which shows the rotor 2 of magnetic material rotatable about center C and having a plurality of permanently magnetized poles 4 equiangularly spaced about the periphery thereof. Adjacent poles are of opposite polarities and are of equal radial lengths. Located outwardly of the path of the poles 4 are a plurality of fixed electromagnets, each having a winding 6 and a horse-shoe shaped magnet with pole faces 8 slightly spaced outwardly from the path of the poles 4. All of the poles 8 of the electromagnets are equiangulary spaced about the rotor center and are equal in number to the poles 4. As in the previous modificaton, the windings of the electromagnets are connected in parallel to a reversing switch S for alternately reversing the direction of current flow to the windings, at the proper time during rotation of the rotor. The reversing switch may be any one of the previously described switches S, provided with a rocker arm 9 having a magnetic plate 11, shown as arcuate in shape. In order to operate the rocker arm 9 to cause the switch S to alternately reverse the current to the windings of the electromagnets a circular disc 10 is provided. A plurality of equiangularly spaced permanent horse-shoe magnets 12, equal in number to the pairs of poles 4 of the rotor, are carried by the disc periphery. The poles of each horse-shoe magnet 12 are spaced from each other angularly about the axis of disc 10, as distinguished from the poles 4 which are spaced from each other in a direction parallel to the axis of rotor 2. The disc 10 is rotated by a shaft 15 connecting the center thereof with the center of rotor 2. The operation of the modified motor just described, is similar to that of the previously described motor. In this case, the switch and operator therefor may be located at a distance from the motor. Any even number of poles 4 may be used with rotor 1 and the disc 10 should carry one-half that number in order to operate the switch S in properly timed relation. It is understood of course, that the disc 10 is so mounted on the shaft 14, that the poles 12 control the switch arm 9 to cause the switch S to deenergize the electromagnets at the time that each pair of oppositely poled permanent magnets confronts the poles of a permanent magnet. Each "pair" of permanent magnets has its north pole spaced from its south pole in the same angular direction.

The motors described above are simple to construct and light in weight, since the permanent magnets may be molded within the rotor and the electromagnets may also be molded within a casing surrounding the rotor with the poles thereof within the casing in order to provide a minimum gap between the stationary and rotatable magnets. A small opening in the casing for entry of the magnetic plate 11 can be provided for interaction with the permanent magnets of the motor.

Although the permanent magnets carried by the rotor disc or plate are shown with their pole-faces facing radially outwardly, it is obvious that they may face outwardly from a side of the rotor disc and the poles of the electromagnets may be so oriented that their pole faces may face those of the permanent magnets.

Having thus described my invention with the particularity required by the statutes it is understood that obvious changes may be made by persons skilled in the art without departing from the spirit and scope of this invention as defined by the appended claims.

What is claimed is:

1. A brushless D.C. motor comprising a rotor provided with a plurality of angularly spaced permanent magnets secured thereto and movable along a circular path,
   at least one fixed electromagnet having a pair of opposite poles spaced from each other in the same angular direction as the poles of the permanent magnets and confronting said path,
   reversing switch means connected between a D.C. source and said at least one fixed electromagnet,
   and operating means controlled by rotation of the rotor to in turn operate said switch means to energize the at least one electromagnet to attract a permanent magnet, to deenergize the at least said one electromagnet, and to then reverse the current to cause said at least one electromagnet to repel the permanent magnet as it passes the one electromagnet, said operating means comprising a magnetic member mounted for limited movement in respectively opposite directions in a plane parallel to that of the rotor for successive magnetic attraction by the permamagnets.

2. A brushless D.C. motor according to claim 1 wherein the poles of the permanent magnets are spaced from each other in a direction parallel to the rotor axis.

3. A brushless D.C. motor comprising a rotor provided with a plurality of angularly spaced permanent magnets secured thereto and movable along a circular path,
   at least one fixed electromagnet having a pair of opposite poles spaced from each other in the same angular direction as the poles of the permanent magnets and confronting said path,
   reversing switch means connected between a D.C. source and said at least one fixed electromagnet,
   and operating means controlled by rotation of the rotor to in turn operate said switch means to energize the at least one electromagnet to attract a permanent magnet, to deenergize the at least said one electromagnet, and to then reverse the current to cause said at least one electromagnet to repel the permanent magnet as it passes the one electromagnet, the poles of the permanet magnets being spaced from each other in a direction parallel to the rotor axis, said operating means including a magnetic member adjacent the path of travel of the permanent magnets for magnetic attraction thereby and comprising a lever pivotally mounted on an axis parallel to the rotor axis, the magnetic member being secured to the lever.

4. A brushless D.C. motor according to claim 3 including biasing means for moving the lever to operate the switch means to deenergize the at least one electromagnet when the magnetic member is not attracted to the permanent magnet.

5. A brushless D.C. motor according to claim 1 wherein the poles of each pair of electromagnets are angularly spaced from each other about the rotor axis, the north poles of all pairs being spaced from their south poles in the same direction.

6. A brushless D.C. motor comprising a rotor provided with a plurality of angularly spaced permanent magnets secured thereto and movable along a circular path,
   at least one fixed electromagnet having a pair of opposite poles spaced from each other in the same angular direction as the poles of the permanent magnets and confronting said path,
   reversing switch means connected between a D.C. source and said at least one fixed electromagnet,
   and operating means controlled by rotation of the rotor to in turn operate said switch means to energize the at least one electromagnet to attract a permanent magnet, to deenergize the at least said one electromagnet, and to then reverse the current to cause said at least one electromagnet to repel the permanent magnet as it passes the one electromagnet, the poles of each pair of electromagnets being angularly spaced from each other about the rotor axis, the north poles of all pairs being spaced from their south poles in the same direction, the operating means controlled by rotation of the rotor comprising a rotary support member rotated in synchronium with the rotor,
   a plurality of angularly spaced elements mounted on said support member and equal to the number of permanent magnets on the rotor,
   and lever means mounted adjacent the path of travel of the elements for operating said switch means.

7. A brushless D.C. motor according to claim 6 wherein said elements are magnets, and
   a magnetic member mounted on said lever for successively linking with the magnetic flux from each said magnet.

8. A brushless D.C. motor according to claim 7 including biasing means for moving the lever to operate the switch means to deenergize the at least one electromagnet when not linked with the magnetic flux of the magnets.

9. A brushless D.C. motor comprising a rotor provided with a plurality of angularly spaced permanent magnets secured thereto and movable along a circular path,
   at least one fixed electromagnet having a pair of opposite poles spaced from each other in the same angular direction as the poles of the permanent magnets and confronting said path,
   reversing switch means connected between a D.C. source and said at least one fixed electromagnet,
   and operating means controlled by rotation of the rotor to in turn operate said switch means to energize the at least one electromagnet, and to then reverse the current to cause said at least one electromagnet to repel the permanent magnet as it passes the one electromagnet, wherein the rotor is in the form of a flant ring,
   a housing of magnetic flux transparent material adjacent to and about the periphery of the rotor,
   means external to the housing for supporting said at least one electromagnet, said reversing switch means and said operating means adjacent the outer surface of the housing for cooperation with said permanent magnets on the rotor,
   the pole faces of the permanent magnets being at the rotor periphery, and
   means within the housing for supporting the rotor for rotation therein.

10. A brushless D.C. motor according to claim 9 wherein the means for supporting the rotor for rotation comprises a propeller mounted for rotation within the housing, and means securing the tops of the propeller blades to the rotor for rotation thereby.

11. A brushless D.C. motor according to claim 10 wherein said operating means includes a magnetic member adjacent the path of travel of the permanent magnets for magnetic attraction thereby.

12. A brushless D.C. motor according to claim 11 wherein said operating means comprises a lever pivotally mounted on an axis parallel to the rotor axis, the magnetic member being secured to the lever.

13. A brushless D.C. motor according to claim 9 wherein said operating means includes a magnetic member adjacent the path of travel of the permanent magnets for magnetic attraction thereby.

14. A brushless D.C. motor according to claim 13 wherein said operating means comprises a lever pivotally mounted on an axis parallel to the rotor axis, the magnetic member being secured to the lever.

15. A brushless D.C. motor comprising a rotor provided with a plurality of angularly spaced permanent magnets secured thereto and movable along a circular path, at least one fixed electromagnet having a pair of opposite poles spaced from each other in the same angular direction as the poles of the permanent magnets and confronting said path, reversing switch means connected between D.C. source and said at least one fixed electromagnet, and operating means controlled by rotation of the rotor to in turn operate said switch means to energize the at least one electromagnet to attract a permanent magent, to deenergize the at least said one electromagnet, and to then reverse the current to cause said at least one electromagnet to repel the permanent magnet as it passes the one electromagnet, the reversing switch means including a transistor circuit for reversibly controlling the current through the at least one electromagnet in response to application thereto of biasing voltages of alternate opposite polariites, a pair of parallelly mounted magnetically controlled reed switches, a magnet having its pole faces in common plane parallel to the plane of said reed switches, means mounting said switches and said magnet for relative rotation in their respective planes from a neutral position wherein the magnetic flux of the magnet is ineffective to close the switches to a position in one direction to effect closure of one switch by the magnetic flux and to a position in the opposite direction to effect opening of the one switch and closure of the second switch by the magnetic flux, one reed of each switch being connected to a respective terminal of a D.C. source, the other reed of each switch being connected in common to the transistor circuit for applying thereto said biasing voltages.

16. A brushless D.C. motor according to claim 15 wherein said reed switches are stationary and said magnet is movable.

17. A brushless D.C. motor according to claim 16 wherein the magnet is rockable in both directions about an axis normal to said planes.

* * * * *